United States Patent [19]
Psaltis et al.

[11] Patent Number: 5,453,969
[45] Date of Patent: Sep. 26, 1995

[54] OPTICAL MEMORY WITH PIT DEPTH ENCODING

[75] Inventors: Demetri Psaltis; David Marx, both of Pasadena, Calif.; Gabriel Sirat, Paris, France

[73] Assignee: California Institute of Technology, Oasadena, Calif.

[21] Appl. No.: 238,756

[22] Filed: May 4, 1994

[51] Int. Cl.[6] .......................................... G11B 7/00
[52] U.S. Cl. .......................... 369/109; 369/110; 369/112; 369/275.1; 369/275.4
[58] Field of Search .............................. 369/275.1, 275.4, 369/109, 110, 112

[56] References Cited

U.S. PATENT DOCUMENTS

| | | | |
|---|---|---|---|
| 5,016,240 | 5/1991 | Strandjord | 369/275.4 X |
| 5,144,552 | 9/1992 | Abe | 369/275.4 |
| 5,339,304 | 8/1994 | Hanaoka | 369/275.4 X |

*Primary Examiner*—David C. Nelms
*Assistant Examiner*—Son Mai

*Attorney, Agent, or Firm*—Michael L. Keller; Robert M. Wallace

[57] ABSTRACT

An optical storage medium constitutes a substrate imprinted with optically detectable pits, each of the pits having one of a set of predetermined pit depths, each of the pits representing a number of binary bits corresponding to the number of the predetermined pit depths in the set. The pit depth is sensed unambiguously with a conoscopic holography sensor by changing the polarization of a polarized reflected beam in accordance with its angle of propagation and sensing an intensity pattern produced after the reflected beam passes through a polarized analyzer. Alternatively, using a confocal microscopy sensor, light from either the deepest or most shallow pit depth is focused on a small pin hole in an opaque surface, and a single detector measures the light intensity on the other side of the pin hole, the light intensity being a direct measure of the pit depth. The capacity of an optical memory such as a CD disk player is increased as much as four or five times by pit-depth encoding the disk, so that each pit location represent a number of bits. For example, a standard pit depth of 3 micrometers in a CD disk is divided into 0.1 micron steps so that each pit represents nearly 5 bits, providing a nearly five-fold increase in disk capacity.

24 Claims, 4 Drawing Sheets

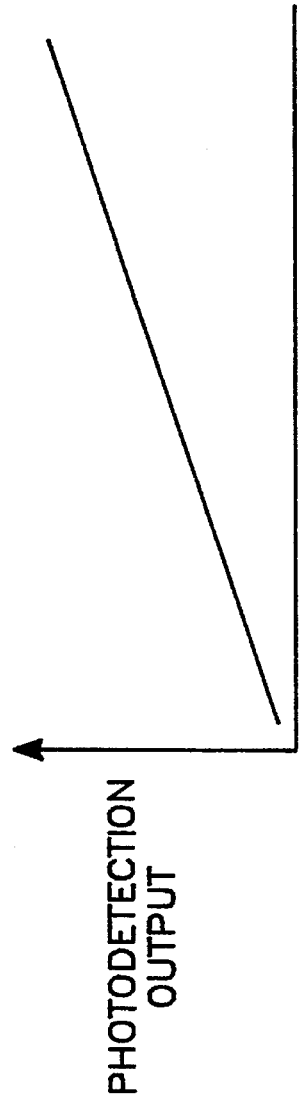
FIG. 3
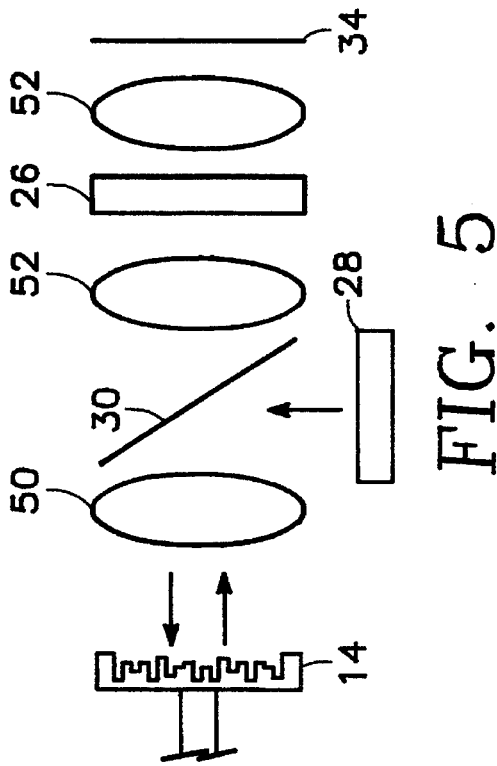
FIG. 5
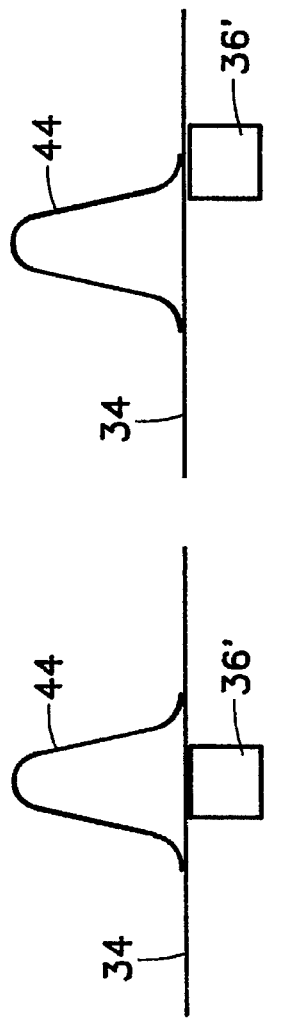
FIG. 4A
FIG. 4B

OPTICAL MEMORY WITH PIT DEPTH ENCODING

BACKGROUND OF THE INVENTION

1. Technical Field

The invention concerns optical memories including the type of optical memory embodied in a compact disk and compact disk drive.

2. Background Art

The most popular form of an optical memory is the compact disk with a compact disk drive used with personal computers, for example, and compact disk player used with high-fidelity stereo sound systems. The compact disk is an aluminum platter having pits stamped in the surface, each pit corresponding to one bit of information, or each pair of neighboring pits representing a differentially encoded bit. The top and bottom surfaces of the aluminum platter are covered with a hard plastic coating. Manufacturing the disk merely involves stamping the aluminum platter with a desired pit pattern and then coating the platter. The optical disk drive or disk player has a spindle on which the disk is mounted for rotation, a laser, an optical detector and a lens which scans the laser's beam radially across the disk surface while the disk rotates. The signal produced at the detector can be processed to deduce the sequence of pits in the disk.

The capacity of such a memory is limited by the number of pits that can be recorded in the disk. This in turn is limited by the disk diameter and the minimum spot size which the optics in the player or disk drive is capable of resolving. Generally, the bit capacity of the memory corresponds to the maximum number of bits recordable on the disk.

SUMMARY OF THE DISCLOSURE

The capacity of an optical memory such as a CD disk player is increased as much as four or five times by pit-depth encoding the disk, so that each pit location represent a number of bits. For example, a standard pit depth of 3 micrometers in a CD disk is divided into 0.1 micron steps so that each pit represents nearly 5 bits, providing a nearly five-fold increase in disk capacity. A CD player with the ability to read such a disk would have five times the capacity of current CD players.

In order to reliably read such a disk, the invention includes a conoscopic holographic sensor employing a principle first disclosed by Sirat and Psaltis, "Conoscopic Holography,"*Optics Letters, Vol.* 10, No. 1(January 1985) pages 4–6. The novel sensor provides an unambiguous measure of pit depth over the entire pit depth range. This sensor includes a birefringent crystal facing the disk surface, a laser illuminating the disk surface and an optical detector or pair of detectors (or, in a robust embodiment, a detector array). A laser beam of polarized light illuminates a spot on the disk surface. As the disk rotates, the depth of the pit at the particular spot illuminated by the laser beam determines the angular spectrum of the light reflected from the disk. The birefringent crystal rotates the polarization of the reflected light as a function of the angular spectrum of the reflected light. After the birefringent crystal, the reflected light passes through a polarizer/analyzer and onto a detector plane. Due to the interaction of the rotated polarization of the reflected light and the polarizer/analyzer, the image at the detector plane consists of light fringes whose spacing is a function of the angular spectrum, which in turn is determined by the pit depth. Several wavelengths in pit depth modulation move a fringe completely across a detector in the detector plane, thereby providing an unambiguous measure of pit depth over several wavelengths.

In accordance with another aspect, the pit depth is sensed by a confocal microscopy sensor employing the principle of confocal microscopy. In this embodiment, light from either the deepest or most shallow pit depth is focused on a small pin hole in an opaque surface, and a single detector measures the light intensity on the other side of the pin hole, the light intensity being a direct measure of the pit depth.

BRIEF DESCRIPTION OF THE DRAWINGS

FIG. 3 is a graph illustrating the combined output of a pair of detectors in the system of FIG. 2 as a function of pit depth.

FIGS. 4A and 4B illustrate how a fringe moves across a detector of the detector plane of FIG. 2 in a preferred implementation.

FIG. 5 is a diagram of an other embodiment of an optical memory system of the invention.

DETAILED DESCRIPTION OF THE PREFERRED EMBODIMENTS

Figure 1:
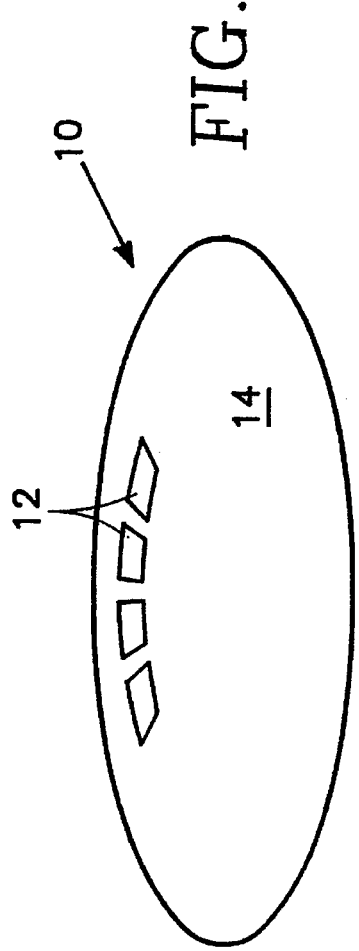
FIG. 1 is a perspective view of a disk of the present invention having pit depth encoding.

FIG. 1 illustrates a compact disk 10 having depth-encoded pits 12 in its plastic-encased aluminum platter 14. In a preferred embodiment, the pits 12 range in depth from zero to 3 micrometers in 0.1 micrometers steps, so that each pit represents nearly five bits of digital information.

Figure 2:
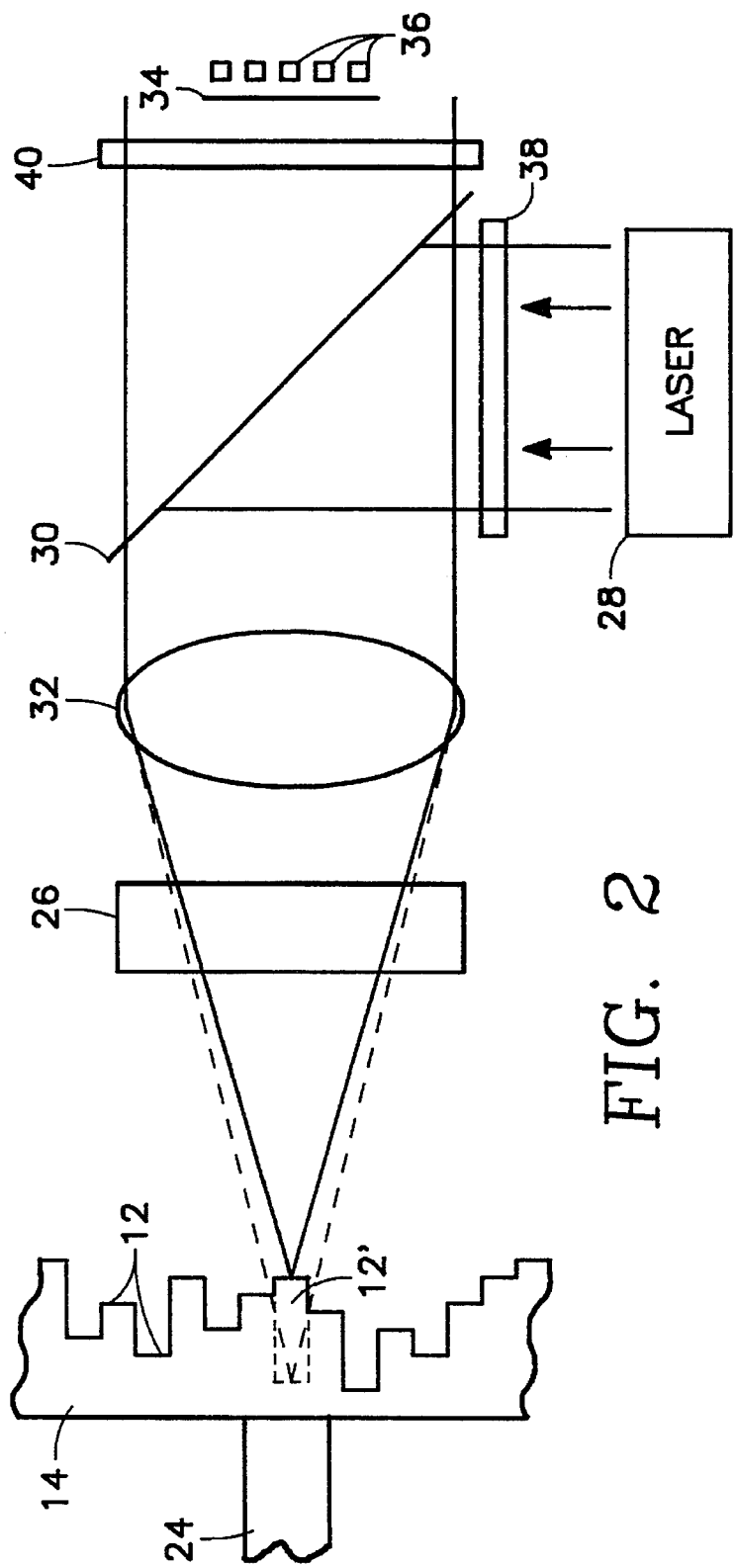
FIG. 2 is a diagram of an optical memory system embodying the invention.

The structure of the pits is best seen in FIG. 2, showing a partial cross-sectional side view of the disk 10 and the pits 12. A spindle 24 centers and rotates the disk 10. The surface of the disk 10 is illuminated by a laser beam from a laser 28 through a beam-splitter 30 and a lens system 32. The lens system 32 focuses the incident light onto the disk surface through a birefringent crystal 26 such as calcite. A detector plane 34 having a number of photodetector pixels 36 is illuminated by light reflected from the disk surface through the beam splitter 30. The beam from the laser 28 is polarized, while the reflected light incident on the detector plane 34 is analyzed by a polarizer 40.

The polarization rotation of the reflected light passing through the birefringent crystal 26 is proportional to the optical path length through the crystal 26 which, in turn, is proportional to the angular spectrum of light propagating through the crystal 26 and lens 32 relative to the optic axis of the birefringent crystal. This angular spectrum is a function of the angle subtended by the light cone whose base is the aperture of the lens 32 and whose apex is any point on the bottom surface of the pit 12'. As shown in FIG. 2, a shallow pit produces a wider angle light cone (solid line) while a deeper pit produces a narrower angle light cone (dashed line).

Accordingly, the birefringent crystal 26 produces a spatial variation in polarization of the reflected light beam passing therethrough. The reflected light beam passes through the polarizer/analyzer 40 to produce intensity fringes at the detector plane corresponding to the spatial variation in polarization of the reflected light. The intensity fringes are caused by the analyzer 40 blocking those parts of the reflected light whose polarization orientation was rotated orthogonal to the polarization of the polarizer/analyzer 40. The intensity fringes in the detector plane 34 follow the form of the following equation for intensity I as a function of position x in the detector plane 34:

$$I(x) \sim 1+\cos(2\pi L\delta n(x-x')^2, \qquad (1)$$

where x' is the location of the center of the fringes, while the number of fringes F in the intensity pattern is governed by the distance z from the lens to the spot on the disk surface illuminated by the focused beam in accordance with the following equation:

$$F = L\delta n\, A^2/z^{2\Gamma}, \qquad (2)$$

where L is the thickness of the birefringent crystal 26, δn is the difference between the ordinary and extraordinary indices of refraction of the birefringent crystal 26, A is the physical aperture of the lens 32 and Γ is the wavelength of the laser beam.

As the laser beam encounters pits 12 of different depths, the fringe pattern at the detector plane 34 changes in accordance with Equation 2, which is detected by the photodetectors 36. In practical application, a selected photodetector, or, preferably, a selected pair of photodetectors 36 provide a measure of the change in amplitude across the entire range of pit depths, so that the detector plane 34 may consist of only one or two photodetectors while providing an unambiguous measurement of the pit depth. For this purpose, the size of an individual detector 36 is less than the width of an interference fringe in the detector plane 34.

While FIG. 2 shows ray optics, it should be noted that the pit aperture is preferably on the order of the light wavelength and the pit depth range is within the depth of focus of the lens 32, so that ray optics is not strictly applicable in the region of the pit 12'.

In order to measure a pit's depth using standard interferometric techniques, the polarizer/analyzer 40 and the birefringent crystal 26 are removed and a mirror (not shown) is added to the unused leg of the beam splitter 30 to reflect the reference beam to the detector plane 34. The reflected beam passes through the beam splitter 30 and the reference beam is deflected by the beam splitter 30 so that both beams coincide on the detector plane 34, where they interfere. However, standard interferometry is not preferred because there is a phase ambiguity every half wavelength.

The conoscopic holographic sensing apparatus described above with reference to FIG. 2 overcomes this shortcoming. Absolute depth can be measured by counting fringes, and relative depth of two pits can be determined by the movement of selected fringes. Therefore, if each bit is differentially encoded on the disk 10 as the difference between a pair neighboring pits, then only a few detectors are required in the detector plane 34. One advantage of differential encoding is that it allows focus to be maintained by a focus servo. The accuracy of the depth measurement in accordance with Equations 1 and 2 depends upon the system numerical aperture, the ordinary-extraordinary refraction index difference δn of the birefringent crystal 26, the length L of the crystal and the numerical aperture of the lens 32. If the numerical aperture of the optical system is increased, then the depth of focus decreases, but the accuracy of the depth measurement increases proportionally. Therefore, the pit depth encoding of the present invention always provides an increase in storage density.

Another advantage of conoscopic holography over interferometry is that the reference beam need not be coherent. Thus, while a laser beam source must be employed for interferometry, the conoscopic holographic sensing apparatus of FIG. 2 can employ either a laser or a non-coherent but narrow-spectrum source such as a light emitting diode.

WORKING EXAMPLE

In one demonstration of the embodiment of FIG. 1, the birefringent crystal 26 was a calcite crystal 37 mm thick, the lens 52 had a focal length of 85 mm and the lens 50 had a numerical aperture of 0.7. The optic axis of the calcite crystal was oriented relative to the optical axis of the lens 32 so that the center of the fringes appeared at the edge of the detector plane 34. The numerical aperture of the lens 52 was 0.05 and the beam polarizer 38 was circularly polarized and had a wavelength of 633 nanometers. The polarizer 40 was a linear polarizer. FIG. 3 illustrates a response obtained from the product divided by the sum of the outputs of a pair of neighboring photodetectors 36 in the detector plane 34 over a depth range of 3.0 micrometers in 0.1 micrometer steps. The advantage of combining pixel outputs in such a manner is that the output of one pixel may be linear over half the range while the output of the other pixel is linear over the remaining half of the range, so that their combination is nearly linear over the entire range.

The angle between the optic axis of the calcite crystal and the optical axis of the lens system is preferably selected so that fringes are formed at the center of the beam at the detector plane 34, allowing centrally located detectors to perform all the functions of signal detection, focus servo detection and tracking servo detection, depending upon the system design. Also, the angle of the calcite crystal optic axis can be chosen to set a particular fringe spacing at the centrally located detector.

Other alternatives may be employed in obtaining an accurate depth measurement from the photodetectors 36 in the detector plane 34. For example, all of the photodetectors 36 in the array constituting the detector plane 34 may be fed to respective inputs of a pattern recognition algorithm 42 (or a neural network) which is calibrated (or trained) with a known disk to provide unambiguous depth measurements over the entire range.

Operation of an implementation employing at least a single photodetector 36' in the detector plane 34 is illustrated in FIGS. 4A and 4B. The location of the photodetector 36' in the detector plane 34 is chosen so that whenever the light beam is focused on a pit of the maximum depth (e.g., a depth of 3.0 micrometers), an intensity fringe 44 completely covers the detector 36' as in FIG. 4A so that the detector 36' receives a minimum amount of light, and whenever the light beam is focused on a pit of minimum depth (e.g., zero depth), the fringe 44 has moved away from the detector 36' as in FIG. 4B so that the detector 36' receives a maximum amount of light.

FIG. 5 illustrates another arrangement of the optical system, in which a lens 50 moveable radially across the disk 10 to different tracks focuses light through a lens system 52 onto the birefringent crystal 26, the crystal 26 and the lens system 52 being stationary so as to reduce the mass that must be moved in traversing across the disk tracks.

One way of readily determining the optimum orientation of the optic axis of the crystal 26 may be considered with reference to the embodiment of FIG. 5. In the following example, the lenses 52 in FIG. 5 are removed. While the reference beam is focused on a pit of medium depth (a depth half-way between the maximum and minimum pit depth), the optic axis of the calcite crystal 26 is rotated until nearly all of the detector plane 34 is illuminated by a nearly uniform gray light intensity. In this implementation, at a minimum pit depth one side of the detector plane 34 is illuminated by a maximum light intensity while the other side is dark, and at a maximum pit depth the other side of the detector plane 34 is illuminated by a maximum light intensity while the one side is dark. Unknown pit depths are determined by comparing intensity of illumination of the two sides of the detector plane 34.

In one alternative embodiment, the disk is transparent and is illuminated from the backside, so that light transmitted through the disk is incident on the birefringent crystal.

Figure 6:
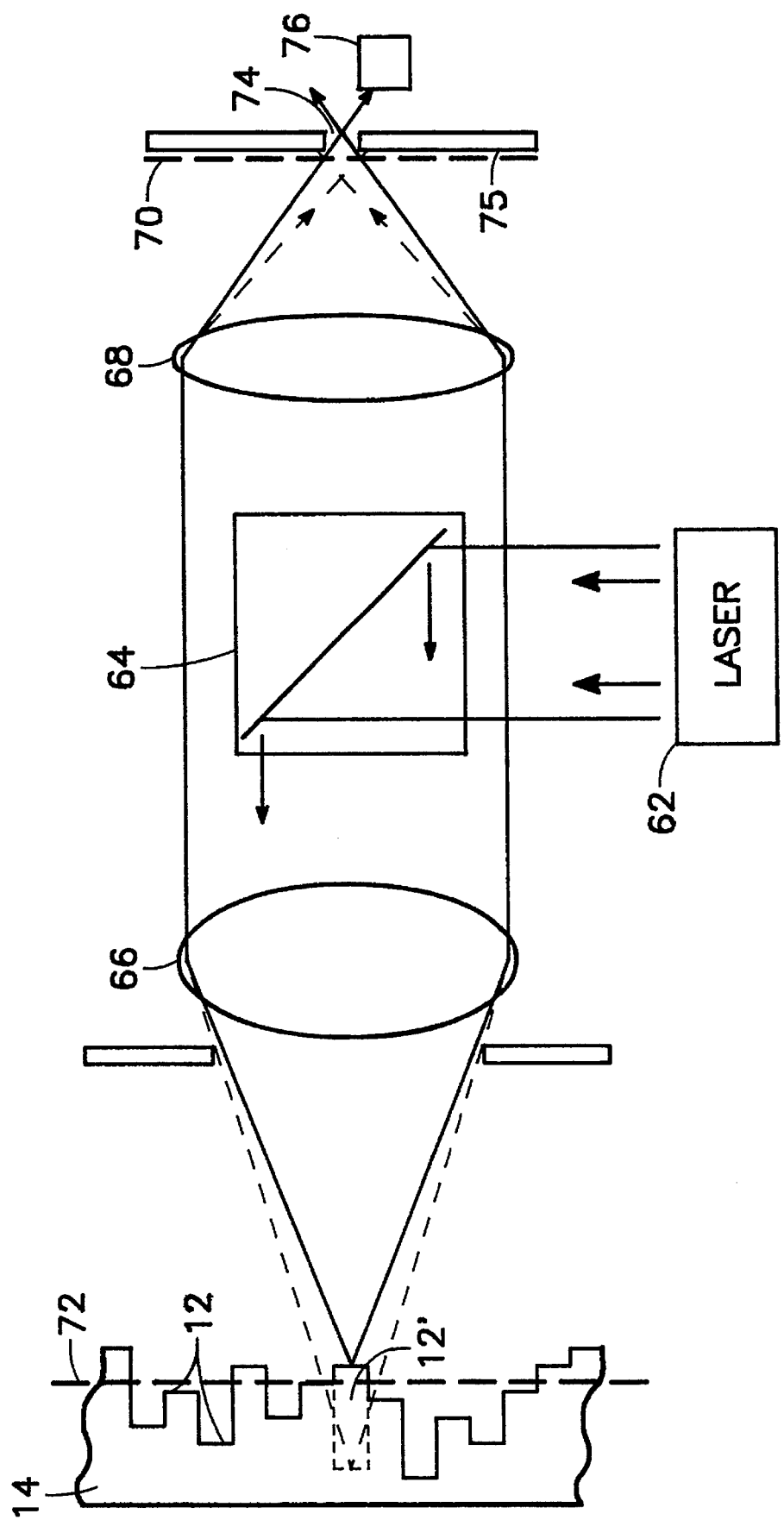
FIG. 6 is a diagram of an optical memory system in accordance with another aspect employing a confocal microscopy sensor.

In accordance with another aspect, the pit depth is measured with a confocal microscopy sensor. Referring to FIG. 6, light from a laser source 62 passes through a beam splitter 64 and an objective lens 66 to form a diffraction-limited spot on the disk 14. The reflected light passes back through the objective lens 66, the beam splitter 64 and through a second objective lens 68 to form a focused spot in a plane near a back focal plane 70. The cross section of the beam at the back focal plane 70 is a conjugate image of the cross section of the reflected beam at a front focal plane 72. The depth of the illuminated pit modulates the reflected beam cross section at the front focal plane 72 and thus modulates the beam cross section at the back focal plane 70. A pin hole 74 in an opaque surface 75 passes a maximum amount of light when the incident light comes to a focus in the plane of the opaque surface 75. When the reflected light comes to a focus in a plane other than that of the opaque surface 75, then the pin hole 74 passes an amount of light or light intensity approximately proportional to the inverse square of the distance between the other (actual) plane of focus and the plane of the opaque surface 75. A detector 76 measures the light intensity passing through the pin hole 74.

As an example, in one case the reflecting (bottom) surface of the pit 12' may lie exactly in the front focal plane 72 while the pin hole 74 is exactly in the back focal plane 70. Because the reflected light at the front focal plane 72 will be exactly the focused incident light, the cross section at the back focal plane 70 will also be a focused spot, and the light passed by the pin hole 74 will be a maximum intensity, producing a large output from the detector 76. If the pit surface is beyond the front focal plane 72 (e.g., a "deep" pit), then the cross section of the reflected light at the front focal plane 72 will be larger than a focused spot and diverging. As a result, the cross section at the pin hole 74 (placed at the back focal plane 70 in this example) will also be larger than a focused spot and converging. Since the cross section in such a case will be larger than a focused spot, the pin hole 74 will only pass a small amount of the light intensity, an the output of the detector 76 will be accordingly small.

The confocal microscopy embodiment of FIG. 6 can also be used where the disk 14 is transmissive. In this case, the varying thickness (different pit depths) of the disk material modulates the beam cross section at the front focal plane 72.

The confocal microscopy embodiment of FIG. 6 has an advantage over the conoscopic holography embodiment of FIG. 2 in that it does not require polarizers, birefringent crystals or a polarized light source. The disadvantage of the confocal microscopy embodiment of FIG. 6 is that the placement of the pin hole 74 is very critical, whereas none of the components of the conoscopic holography embodiment of FIG. 2 have such a critical placement.

Figure 7:
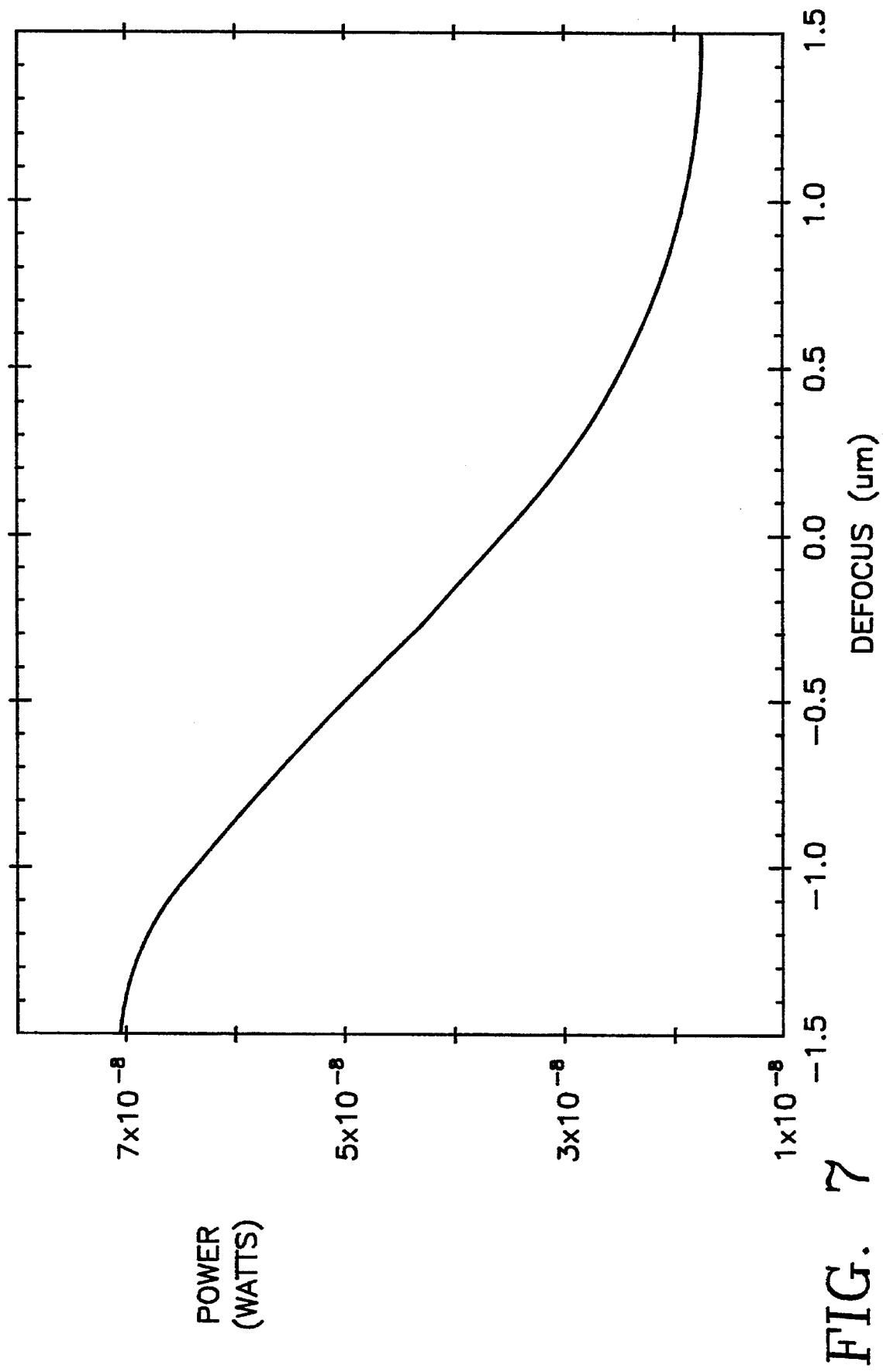
FIG. 7 is a graph illustrating the output of a photodetector in the embodiment of FIG. 6 as a function of pit depth.

In a demonstration of the confocal microscopy embodiment of FIG. 6, the illuminating lens 66 was a 50 power, 0.7 numerical aperture objective; the receiving lens 68 was a 15 power objective; and the pin hole 74 was 15 micrometers in diameter. The wavelength of the laser source 62 was 633 nanometers. The detector 76 was placed off center with respect to the light path through the pin hole 74 so as to detect maximum changes in light intensity. To adjust the front and back focal planes 72, 70, a reflecting surface (not shown) was first placed in a plane corresponding to the middle pit depth, and the illuminating lens 66 was adjusted to place the front focal plane 72 at the reflecting surface. Placing the front focal plane at the middle of the pit depth range maximizes the pit depth range that will be within the depth of focus of the illuminating spot. After the front focal plane 72 is thus adjusted, the reflecting surface is placed in a plane corresponding to either the deepest or shallowest pit, and the pin hole 74 and back objective 68 are adjusted to pass a maximum amount of light. If the pin hole 74 passes the maximum light intensity for pits at one extreme, then it will pass less light for all other pit depths monotonically, thereby avoiding any possible ambiguity in pit depth measurement. FIG. 7 is a graph illustrating an example of the output of the detector 76 observed as a function of pit depth in such a demonstration.

While the invention has been described in detail by specific reference to preferred embodiments, it is understood that variations and modifications thereof may be made without departing from the true spirit and scope of the invention.

What is claimed is:

1. An optical memory, comprising:

an optical storage medium having plural pits in a surface thereof, at least some of said pits having different respective pit depths lying within a predetermined pit depth range;

a lens for focusing a reference beam of polarized light onto one of said pits so as to generate a signal beam of polarized light emanating from said pit;

a polarization rotating optical medium illuminated by said signal beam, said polarization rotating optical medium rotating the polarization orientation of light passing therethrough as a function of an angle of propagation of light passing therethrough so as to generate a polarization-rotated signal beam from said signal beam;

a detector plane, said polarization-rotated signal beam being incident on said detector plane; and a polarizer/analyzer in a path of said polarization-rotated signal beam to said detector plane which blocks parts of said polarization-rotated signal beam having a polarization orthogonal to that of said polarizer/analyzer to produce an intensity pattern on said detector plane.

2. The optical memory of claim 1 wherein said polarization rotating optical medium comprises a birefringent crystal having a pair of opposing surfaces and an optic axis, said signal beam incident on one of said opposing surfaces and said polarization-rotated signal beam emanating from the other of said opposing surfaces, said angle of propagation being relative to said optic axis.

3. The optical memory of claim 2 further comprising a reference beam source and a beam splitter for directing said reference beam source to said lens and said signal beam to said detector plane.

4. The optical memory of claim 3 wherein said optical storage medium is reflective and wherein said signal beam is reflected from said optical storage medium and through said birefringent crystal.

5. The optical memory of claim 4 wherein said reference beam and said signal beam pass through both said birefringent crystal and said lens.

6. The optical memory of claim 5 wherein said birefringent crystal is between said storage medium and said lens.

7. The optical memory of claim 6 wherein said optical storage medium is a disk and said lens is between said birefringent crystal and said disk, said lens being movable radially relative to said disk, said memory further comprising means for rotating said disk relative to said lens.

8. The optical memory of claim 1 wherein said intensity pattern comprises at least an intensity fringe whose location is a function of the depth of said one pit onto which said beam is focused, and wherein said detector plane comprises at least one individual optical detector having a size corresponding to a width of said one fringe, and wherein said individual optical detector is at least nearly covered to a maximum extent by said one fringe whenever said one pit has a depth lying at one extreme of said pit depth range and wherein said individual one optical detector is at least nearly uncovered to a maximum extent by said one fringe whenever said one pit has a depth lying at the other extreme of said pit depth range.

9. The optical memory of claim 2 wherein said reference beam is polarized, said optical memory further comprising a polarizer through which said reference and polarization-rotated signal beams pass on their way to said detector plane.

10. The optical memory of claim 9 wherein said reference beam is circularly polarized and said polarizer is a linear polarizer.

11. The optical memory of claim 1 wherein said different pit depths occur at uniform intervals along said pit depth range.

12. The optical memory of claim 11 wherein each of said pits represents a number of binary bits of information corresponding to log base two of the number of said uniform intervals within said pit depth range.

13. A method of reading a pit-depth encoded optical storage medium having a surface with pits of different pit depths within a predetermined pit depth range, comprising the steps of:
   focusing a reference beam through a lens onto a selected one of said pits in said surface of said storage medium to generate a signal beam emanating from said surface;
   polarization rotating said signal beam in a polarization-rotating material by changing the polarization orientation of portions of said signal beam in proportion to their respective angles of propagation through said polarization-rotating material to produce a polarization-rotated signal beam;
   passing said polarization-rotated signal beam to a detector plane through a polarizer to produce an intensity pattern in said detector plane; and
   determining the depth of said one pit from said intensity pattern.

14. The method of claim 13 wherein said intensity pattern comprises at least one fringe whose location is a function of the depth of said one pit, and wherein the step of determining the depth of said one pit comprises detecting movement of at least said one fringe.

15. The method of claim 13 wherein said substrate is a disk, said method further comprising rotating said disk about its axis of symmetry and positioning said reference beam radially so as to select a particular track of said pits.

16. The method of claim 13 wherein said polarization rotating material has an optic axis, and wherein said focusing step is preceded by the step of setting said optic axis to a desired orientation relative to a path followed by said polarization-rotated signal beam.

17. The method of claim 16 wherein said step of setting comprises moving said optic axis to an orientation at which one and an other of a pair of different portions of said detector plane are illuminated with about the same light intensity, whereby said one and other portions of said detector plane are illuminated by respective maximum and minimum light intensities when viewing a pit of maximum depth, said light intensities being reversed when viewing a pit of minimum depth.

18. An optical memory, comprising:
   a substrate imprinted with optically detectable pits, each of said pits having one of a set of predetermined pit depths, each of said pits representing a number of binary bits corresponding to the number of said predetermined pit depths in said set;
   a light source for illuminating at least one of said pits, said light source constituting the only light source in the optical memory;
   an optical sensor having a field of view for measuring the depth of an illuminated one of said pits lying within said field of view; and
   means for transporting said substrate relative to said optical sensor to locate a particular one of said pits in said field of view.

19. The optical memory of claim 18 wherein said optical sensor comprises a conoscopic holographic sensing apparatus.

20. The optical memory of claim 18 wherein said optical sensor comprises an interferometric sensing apparatus.

21. The optical memory of claim 18 wherein the substrate is a disk of a reflective material, said means for transporting comprises means for rotating said disk, and a transparent protective coating covers said disk.

22. The optical memory of claim 18 wherein said light source emits a coherent light beam having a particular wavelength.

23. The optical memory of claim 18 wherein said light source emits a non-coherent, narrow spectrum light beam.

24. The optical memory of claim 18 wherein the number of said predetermined pit depths in said set is an integer greater than two.

* * * * *

UNITED STATES PATENT AND TRADEMARK OFFICE
CERTIFICATE OF CORRECTION

PATENT NO. : 5,453,969
DATED : September 26, 1995
INVENTOR(S) : Psaltis, et al

It is certified that error appears in the above-identified patent and that said Letters Patent is hereby corrected as shown below:

Column 1, line 3, insert the following

-- This invention was developed with support from the United States Department of the Army under Contract No. DAAH04-93-G-0078 in which the contractor has elected to retain title.--

Signed and Sealed this

Twenty-sixth Day of March, 1996

BRUCE LEHMAN

*Attest:*

*Attesting Officer*  *Commissioner of Patents and Trademarks*